United States Patent Office 3,012,951
Patented Dec. 12, 1961

3,012,951
NUCLEAR FUEL ELEMENT AND METHOD OF MANUFACTURE OF SAME
Samuel Storchheim, Kingston, Pa., assignor to Martin-Marietta Corporation, a corporation of Maryland
No Drawing. Filed May 19, 1958, Ser. No. 735,937
6 Claims. (Cl. 204—154.2)

This invention relates to a novel article of manufacture and methods of preparing the same. More particularly, it relates to an improved manufacture of clad nuclear fuel elements wherein the clads are metallugically bonded to and mechanically locked to the core to provide an improved interconnection between these members.

In the nuclear reactor art, rods, tubes or flat plate members containing fissionable material are suitably spaced in a nuclear reactor for the purpose of emitting energy which is normally transferred to liquids or gases which are brought into contact with these members. It is essential to the proper operation of such reactors that these liquids or gases which contact these members absorb energy from them, without however, contacting the fissionable material and it is therefore essential that this fissionable material, which is normally contained in the inner portion or core of the fuel element, be completely and effectively clad with a non-fissionable material. It is further essential that this clad material be impevious to corroding media in the liquid or gas and that it be adequately bonded to the core to prevent break throughs or bond failures.

Heretofore, the clads or coatings used to isolate the cores of fuel elements have been bonded or adhered thereto by known metallurgical techniques such as by rolling and heat treating the elements with the core and clad in juxtaposition. These methods have yielded fuel elements which do not have sufficiently strong bonds between the clad and the core with the result that these bonds have failed in use with consequent deleterious effects on the operations of the reactors involved.

It is a primary object of the present invention to provide a method of manufacturing nuclear fuel elements wherein the bond between the clad and core is stronger than known bonds.

It is a further object of this invention to provide clad nuclear fuel elements which the clad firmly and strongly bonded to the core.

It is another object of this invention to provide such a fuel element wherein the clad and core are mechanically interlocked as well as metallurgically bonded to one another.

Still another object of this invention is to provide a method of assuring a strong mechanical bond between the clad and core in such a fuel element regardless of the methods otherwise used to join these members to one another.

Other objects and advantages of this invention will become apparent from the following description and explanation thereof.

In accordance with the present invention the core is formed from a mixture of a powdered ceramic fissionable material, a powdered matrix metal that will bond with the ceramic fissionable material and hard particles which are generally relatively harder and have a relatively larger size than the matrix metal and which will also bond with the ceramic fissionable material. The clad is formed of a metal that can be readily bonded to the core and is generally composed of the same metal as the matrix metal.

In more detail the powdered ceramic fissionable material, such as uranium dioxide, thorium dioxide, plutonium dioxide, uranosic oxide, etc., has an average particle size from about 200 to 500 mesh. This ceramic fissionable material comprises up to about 50% by weight of the core depending upon the matrix metal used and the overall design requirements of the fuel element.

The powdered matrix metal may be chosen from a variety of metals which have the following characteristics: a melting point of about 650° to 2620° C.; a thermal neutron cross-section below 5.0 barns; and belong to groups IIIA, IVB having an atomic number of at least 22 and not greater than 40, VIB or VIII of the periodic chart. Examples of metals that may be used are aluminum, stainless steel, molybdenum, nickel, etc. or alloys of these metals. For thermal reactors it is desirable that the matrix metal have a low thermal neutron absorption cross-section and that this metal be structurally stable during thermal or other treatment of the core or core and clad during manufacture of the fuel element. This matrix metal has an average particle size of 200 to 500 mesh and is added to the core mixture in an amount of about 40 to 80% by volume of the total mixture.

The hard particles in the core mixture are generally relatively harder than the matrix metal and always have a particle size which is relatively larger than the powdered matrix metal. These particles may be varied over a considerable range of sizes as long as their largest dimension is smaller than the thickness of the core and as long as they are larger than the matrix metal powder. As stated, these particles are generally harder than the matrix metal and yet they must be capable of being bonded thereto and must also be capable of bonding to the ceramic fissionable powder. It has been found for instance, that these requirements are met if when the matrix metal used is aluminum the particles are either aluminum oxide ($Al_2O_3$) or stainless steel, and where the matrix metal used is stainless steel the particles are aluminum oxide. These particles are added to the core mixture in an amount of about 5 to 35% by volume of the total mixture. It is also possible to attain the desired bond by adding such particles as described above but which are not relatively harder than the matrix metal where, however, these particles alloy with the matrix metal and the clad to form a metallurgical as well as a mechanical bond therebetween. As an example, particles formed from nickel may be used where the clad and matrix metal are aluminum and during heat treating the nickel particles will alloy with the aluminum to form a bond between core and clad.

The clad metal is normally formed from the same metal as the matrix metal. It should be understood that "a metal" designates generically a single metal or an alloy of two or more metals such as stainless steel.

Using the above described materials a nuclear fuel element is manufactured in accordance with the present invention by uniformly inter-mixing the ceramic fissionable material, the matrix metal and the hard particles together and depositing this mixture between clad metal members either prior to or after compacting the mixture. This assembly of the mixture or core and the clad members is then reduced in size and mechanically bonded together by hot pressing operations in a split die followed by heat treatments until the desired reduction in size has been accomplished. The bonding is then completed by sintering the assembled element to effect a bond at the interfaces between the core and the clad and across these interfaces around the particles.

During these rolling or pressing operations the hard particles at or adjacent the surfaces of the core, if they are relatively harder than the matrix metal, are embedded into the clad members as well as the core and form a mechanical bond between these members in addition to the metallurgical bond that is accomplished by sintering. If the hard particles readily alloy with the matrix metal and the clad members then those particles at or adjacent the surfaces of the core alloy with the matrix metal and the clad members to thus form a metallurgical bond between the core and clad during heat treating of the assembled element. Thus these hard particles act to mechanically and to a certain extent metallurgically lock the core and the clad together.

In order to provide a better understanding of the present invention, references will be had to the following specific examples.

*Example I*

The core comprises 25% by volume of the $UO_2$ powder, having a size of 300 mesh intermixed with 50% by volume of aluminum powder having a size of 300 mesh and with 25% by volume of aluminum oxide particles having an average size of about 2500 microns across their largest dimension. This core mixture is deposited between a pair of concentrically spaced aluminum tubular clad members which are closed at one end. The mixture is next compacted by tamping and the other end of the tubular clads is partially closed. A mandrel is then positioned inside the inner tubular clad and the assembled element is hot pressed in a split die at about 575° C. for about 10 minutes until the desired reduction in cross-sectional area is accomplished. The mandrel is then removed, the partially closed end is sealed and the assembled element is sintered in the atmosphere at 570° C. for about 1 hour. The clad tubular fuel element is thus completed with a strong metallurgical and mechanical bond between the core and the clad members.

*Example II*

The core comprises 25% by volume of $UO_2$ powder having a size of 300 mesh intermixed with 60% by volume of a stainless steel powder having a size of 200 mesh and 15% by volume of aluminum oxide particles having an average size of about 2200 microns across their largest dimension. This core mixture is partially compacted into a tubular core and stainless steel tubular clad members are positioned adjacent the inner and outer surfaces of this partially compacted core and the ends thereof are sealed. A mandrel is then positioned inside the inner clad member and the assembly is hot pressed at about 1150° C. in a dry hydrogen atomsphere for about 10 minutes until the desired reduction in cross-sectional area is accomplished. The mandrel is then removed and the assembled element is sintered in a dry hydrogen atmosphere for about ½ hour at 1200° C.

I claim:

1. A tubular fuel element for a nuclear reactor comprising an elongated cylindrical cermet core encased in and metallurgically bonded to inner and outer metal tubes concentric with said core, said core consisting of sintered particles of a matrix metal in a continuous phase in an amount equal to about 40% to 80% by volume of said core, about 5% to 35% by volume of keying particles of a material selected from the group consisting of stainless steel and aluminum oxide, and the remainder being particles of an oxide of a fissionable metal selected from the group consisting of uranium dioxide, uranosic oxide, thorium dioxide and plutonium dioxide, said matrix metal and said inner and outer tubes being composed of the same metal selected from the group consisting of aluminum and stainless steel and different from the material selected for said keying particles, said keying particles being of larger size and of greater hardness than said matrix metal particles, the keying particles on the surface of said core being embedded in said inner and outer tubes mechanically locking same to said core.

2. A tubular fuel element for a nuclear reactor comprising an elongated cylindrical cermet core encased in and metallurgically bonded to inner and outer stainless steel tubes concentric with said core, said core consisting of sintered stainless steel particles in a continuous phase in an amount equal to about 40% to 80% by volume of said core, about 5% to 35% by volume of aluminum oxide particles, and the remainder being particles of an oxide of a fissionable metal selected from the group consisting of uranium dioxide, uranosic oxide, thorium dioxide and plutonium dioxide, said aluminum oxide particles being of larger size than said stainless steel particles, the aluminum oxide particles on the surface of said core being embedded in said inner and outer tubes mechanically locking same to said core.

3. A method of fabricating a metallurgically bonded tubular fuel element for a nuclear reactor comprising the steps of encasing a powder core between an inner and outer tube so as to form a hollow elongated cylindrical assembly, said powder core consisting by volume of about 40% to 80% of particles of a matrix metal, about 5% to 35% of keying particles of a material selected from the group consisting of stainless steel and aluminum oxide, and the remainder being particles of an oxide of a fissionable metal selected from the group consisting of uranium dioxide, uranosic oxide, thorium dioxide and plutonium dioxide, said matrix metal and said inner and outer tubes being composed of the same metal selected from the group consisting of aluminum and stainless steel but different from the material selected for said keying particles, said keying particles being of larger size and of greater hardness than said matrix metal particles, reducing the cross sectional area of said assembly so as to embed the keying particles on the surface of said core into said inner and outer tubes, thereby mechanically locking said core to said inner and outer tubes, and heating said assembly as as to sinter said matrix metal and metallurgically bond said core to said inner and outer tubes.

4. The method of claim 3 wherein said matrix metal is aluminum.

5. The method of claim 3 wherein said assembly is reduced in cross sectional area by hot pressing.

6. A method of fabricating a metallurgically bonded tubular fuel element for a nuclear reactor comprising the steps of encasing a powder core between an inner and outer stainless steel tube so as to form a hollow elongated cylindrical assembly, said powder core consisting by volume of about 40% to 80% of particles of a stainless steel matrix metal, about 5% to 35% of keying particles composed of aluminum oxide, and the remainder being particles of an oxide of a fissionable metal selected from the group consisting of uranium dioxide, uranosic oxide, thorium dioxide and plutonium dioxide, said keying particles being of larger size and of greater hardness than said matrix metal particles, reducing the cross sectional area of said assembly so as to embed the keying particles on the surface of said core into said inner and outer tubes.

References Cited in the file of this patent

UNITED STATES PATENTS 2,805,473     Handwerk et al.     Sept. 10, 1957

OTHER REFERENCES

WAPD–PWR–PMM–904, December 3, 1956, pp. 10–11. Available from OTS, Dept. of Comm., Washington 25, D.C., price $2.75.

International Conference on the Peaceful Uses of Atomic Energy, vol. 9, pp. 196–202.